US008954484B2

(12) United States Patent
Long et al.

(10) Patent No.: US 8,954,484 B2
(45) Date of Patent: *Feb. 10, 2015

(54) INCLUSIVE OR BIT MATRIX TO COMPARE MULTIPLE CORRESPONDING SUBFIELDS

(75) Inventors: William F. Long, St. Paul, MN (US); Peter M. Klausler, Madison, WI (US)

(73) Assignee: Cray Inc., Seattle, WA (US)

( * ) Notice: Subject to any disclaimer, the term of this patent is extended or adjusted under 35 U.S.C. 154(b) by 1042 days.

This patent is subject to a terminal disclaimer.

(21) Appl. No.: 12/814,101

(22) Filed: Jun. 11, 2010

(65) Prior Publication Data

US 2010/0318591 A1     Dec. 16, 2010

Related U.S. Application Data

(60) Provisional application No. 61/186,810, filed on Jun. 12, 2009.

(51) Int. Cl.
*G06F 7/00* (2006.01)
*G06F 15/00* (2006.01)
*G06F 7/32* (2006.01)
*G06F 7/02* (2006.01)
*G06F 9/30* (2006.01)
*G06F 17/16* (2006.01)

(52) U.S. Cl.
CPC .............. *G06F 7/02* (2013.01); *G06F 9/30018* (2013.01); *G06F 9/30021* (2013.01); *G06F 9/30036* (2013.01); *G06F 17/16* (2013.01)
USPC .......................................... 708/212; 708/520

(58) Field of Classification Search
USPC ................... 1/1; 708/212; 382/229, 176, 218
See application file for complete search history.

(56) References Cited

U.S. PATENT DOCUMENTS

| | | | |
|---|---|---|---|
| 4,392,198 A | | 7/1983 | Shimazaki |
| 4,710,872 A | | 12/1987 | Scarborough |
| 4,821,181 A | | 4/1989 | Iwasawa et al. |
| 4,833,606 A | | 5/1989 | Iwasawa et al. |
| 4,858,115 A | | 8/1989 | Rusterholz et al. |
| 4,907,194 A | * | 3/1990 | Yamada et al. ............ 365/49.17 |
| 4,967,350 A | | 10/1990 | Maeda et al. |
| 5,036,454 A | | 7/1991 | Rau et al. |
| 5,051,947 A | * | 9/1991 | Messenger et al. ................... 1/1 |
| 5,073,864 A | * | 12/1991 | Methvin et al. ............... 708/212 |
| 5,083,267 A | | 1/1992 | Rau et al. |
| 5,151,991 A | | 9/1992 | Iwasawa et al. |
| 5,170,370 A | | 12/1992 | Lee et al. |
| 5,175,860 A | * | 12/1992 | Yamada ................................ 1/1 |
| 5,175,862 A | * | 12/1992 | Phelps et al. ...................... 712/7 |
| 5,212,697 A | * | 5/1993 | Morita .......................... 714/820 |

(Continued)

FOREIGN PATENT DOCUMENTS

JP      63-120338 A     5/1988

OTHER PUBLICATIONS

"Matlab Communications Toolbox 4 Reference," (2002), pp. 2-66-2-72, 10 pages.

(Continued)

*Primary Examiner* — Chuong D Ngo
*Assistant Examiner* — Matthew Sandifer
(74) *Attorney, Agent, or Firm* — Perkins Coie LLP

(57) ABSTRACT

A computer system is operable to identify subfields that differ in two data elements using a bit matrix compare function between a first matrix filled with pattern elements and a reference pattern.

6 Claims, 6 Drawing Sheets

$$[a_1 \ a_2 \ a_3 \ \ldots \ a_n] \text{ op } \begin{bmatrix} b_{11} & b_{21} & b_{31} & \ldots & b_{n1} \\ b_{12} & b_{22} & b_{32} & \ldots & b_{n2} \\ b_{13} & b_{23} & b_{33} & \ldots & b_{n3} \\ \vdots & \vdots & \vdots & & \vdots \\ b_{1n} & b_{2n} & b_{3n} & \ldots & b_{nn} \end{bmatrix} = [r_1 \ r_2 \ r_3 \ \ldots \ r_n]$$

Multiply:
$r_1 = a_1 \bullet b_{11} \oplus a_2 \bullet b_{12} \oplus \ldots \oplus a_n \bullet b_{1n}$
$r_2 = a_1 \bullet b_{21} \oplus a_2 \bullet b_{22} \oplus \ldots \oplus a_n \bullet b_{2n}$
$\vdots$
$r_n = a_1 \bullet b_{n1} \oplus a_2 \bullet b_{n2} \oplus \ldots \oplus a_n \bullet b_{nn}$ Compare:
$r_1 = a_1 \bullet b_{11} + a_2 \bullet b_{12} + \ldots + a_n \bullet b_{1n}$
$r_2 = a_1 \bullet b_{21} + a_2 \bullet b_{22} + \ldots + a_n \bullet b_{2n}$
$\vdots$
$r_n = a_1 \bullet b_{n1} + a_2 \bullet b_{n2} + \ldots + a_n \bullet b_{nn}$ $\oplus$ = XOR
$\bullet$ = AND
$+$ = OR

(56) References Cited

U.S. PATENT DOCUMENTS

| | | | | |
|---|---|---|---|---|
| 5,247,696 | A | | 9/1993 | Booth |
| 5,619,715 | A | * | 4/1997 | Dinkjian et al. ............... 712/300 |
| 5,805,915 | A | * | 9/1998 | Wilkinson et al. ............... 712/20 |
| 5,822,608 | A | * | 10/1998 | Dieffenderfer et al. ......... 712/20 |
| 6,212,629 | B1 | * | 4/2001 | McFarland et al. ........... 712/241 |
| 7,016,931 | B2 | * | 3/2006 | Pascucci ....................... 708/671 |
| 7,464,089 | B2 | * | 12/2008 | Oh et al. ................................ 1/1 |
| 8,131,979 | B2 | | 3/2012 | Gonion et al. |
| 8,433,883 | B2 | * | 4/2013 | Greyzck et al. ............... 712/223 |
| 2002/0029233 | A1 | * | 3/2002 | Kitamura ...................... 708/212 |
| 2002/0123995 | A1 | * | 9/2002 | Shibuya ............................ 707/6 |
| 2002/0147755 | A1 | * | 10/2002 | Bhushan et al. .............. 708/671 |
| 2002/0149471 | A1 | * | 10/2002 | Coppin ...................... 340/146.2 |
| 2004/0184663 | A1 | * | 9/2004 | Akagi ........................... 382/229 |
| 2006/0059196 | A1 | * | 3/2006 | Sato et al. .................. 707/104.1 |
| 2008/0021943 | A1 | * | 1/2008 | Chiu .............................. 708/212 |
| 2008/0077773 | A1 | * | 3/2008 | Julier et al. ................... 712/210 |
| 2008/0133628 | A1 | * | 6/2008 | Giri ............................... 708/230 |
| 2008/0282073 | A1 | * | 11/2008 | Cabot ........................... 712/300 |
| 2008/0288756 | A1 | * | 11/2008 | Johnson et al. ............... 712/222 |
| 2009/0238474 | A1 | * | 9/2009 | Sandberg ...................... 382/229 |
| 2010/0293344 | A1 | * | 11/2010 | Nishino et al. ................ 711/154 |
| 2010/0318773 | A1 | | 12/2010 | Greyzck et al. |
| 2012/0072704 | A1 | | 3/2012 | Johnson et al. |
| 2012/0158782 | A1 | * | 6/2012 | Transier et al. ............... 707/771 |

OTHER PUBLICATIONS

Chen, et al., "Zero-One Matricies," Obtained via http://cse.unl.edu/~bta/cse/cse235/tutorial/?cat=bool_product, (Nov. 1, 2004), 1 page.

Metzger, et al., "APL thinking finding array-oriented sloutions," 1981, 7 pages.

Non-Final Office Action for U.S. Appl. No. 11/750,928, Date mailed Aug. 21, 2009, 18 pages.

Response to Non-Final Office Action for U.S. Appl. No. 11/750,928, Date mailed Dec. 21, 2009, 11 pages.

Final Office Action for U.S. Appl. No. 11/750,928, Date mailed Mar. 25, 2010, 15 pages.

Response to Final Office Action for U.S. Appl. No. 11/750,928, Date mailed May 25, 2010, 8 pages.

Non-Final Office Action for U.S. Appl. No. 11/750,928, Date mailed Aug. 11, 2010, 17 pages.

Response to Non-Final Office Action for U.S. Appl. No. 11/750,928, Date mailed Nov. 11, 2010, 8 pages.

Final Office Action for U.S. Appl. No. 11/750,928, Date mailed Jan. 19, 2011, 15 pages.

Response to Final Office Action for U.S. Appl. No. 11/750,928, Date mailed Apr. 21, 2011, 9 pages.

Non-Final Office Action for U.S. Appl. No. 13/020,358, Date mailed Aug. 16, 2012, 8 pages.

Non-Final Office Action for U.S. Appl. No. 12/482,618, Date mailed Apr. 25, 2012, 13 pages.

Response to Non-Final Office Action for U.S. Appl. No. 12/482,618, Date mailed Jul. 24, 2012, 10 pages.

Final Office Action for U.S. Appl. No. 12/482,618, Date mailed Aug. 7, 2012, 5 pages.

Response to Final Office Action for U.S. Appl. No. 12/482,618, Date mailed Oct. 17, 2012, 6 pages.

Non-Final Office Action for U.S. Appl. No. 11/750,928, Date mailed Jun. 30, 2011, 19 pages.

Advisory Action for U.S. Appl. No. 12/482,618, Date mailed Oct. 26, 2012, 3 pages.

Notice of Allowance for U.S. Appl. No. 12/482,618, Date mailed Jan. 25, 2013, 7 pages.

* cited by examiner $$\begin{bmatrix} a_1 & a_2 & a_3 & \ldots & a_n \end{bmatrix} \text{ op } \begin{bmatrix} b_{11} & b_{21} & b_{31} & \ldots & b_{n1} \\ b_{12} & b_{22} & b_{32} & \ldots & b_{n2} \\ b_{13} & b_{23} & b_{33} & \ldots & b_{n3} \\ \vdots & \vdots & \vdots & & \vdots \\ b_{1n} & b_{2n} & b_{3n} & \ldots & b_{nn} \end{bmatrix} = \begin{bmatrix} r_1 & r_2 & r_3 & \ldots & r_n \end{bmatrix}$$

Multiply:

$r_1 = a_1 \bullet b_{11} \oplus a_2 \bullet b_{12} \oplus \ldots \oplus a_n \bullet b_{1n}$ $r_2 = a_1 \bullet b_{21} \oplus a_2 \bullet b_{22} \oplus \ldots \oplus a_n \bullet b_{2n}$ $\vdots$ $r_n = a_1 \bullet b_{n1} \oplus a_2 \bullet b_{n2} \oplus \ldots \oplus a_n \bullet b_{nn}$ Compare:

$r_1 = a_1 \bullet b_{11} + a_2 \bullet b_{12} + \ldots + a_n \bullet b_{1n}$ $r_2 = a_1 \bullet b_{21} + a_2 \bullet b_{22} + \ldots + a_n \bullet b_{2n}$ $\vdots$ $r_n = a_1 \bullet b_{n1} + a_2 \bullet b_{n2} + \ldots + a_n \bullet b_{nn}$ $\oplus$ = XOR
$\bullet$ = AND
$+$ = OR

FIG. 1

$$\begin{bmatrix} a_{11} & a_{12} & a_{13} & \ldots & a_{1n} \\ a_{21} & a_{22} & a_{23} & \ldots & a_{2n} \\ a_{31} & a_{32} & a_{33} & \ldots & a_{3n} \\ \vdots & \vdots & \vdots & & \vdots \\ a_{n1} & a_{n2} & a_{n3} & \ldots & a_{nn} \end{bmatrix} \text{ op } \begin{bmatrix} b_{11} & b_{21} & b_{31} & \ldots & b_{n1} \\ b_{12} & b_{22} & b_{32} & \ldots & b_{n2} \\ b_{13} & b_{23} & b_{33} & \ldots & b_{n3} \\ \vdots & \vdots & \vdots & & \vdots \\ b_{1n} & b_{2n} & b_{3n} & \ldots & b_{nn} \end{bmatrix} = \begin{bmatrix} r_{11} & r_{12} & r_{13} & \ldots & r_{1n} \\ r_{21} & r_{22} & r_{23} & \ldots & r_{2n} \\ r_{31} & r_{32} & r_{33} & \ldots & r_{3n} \\ \vdots & \vdots & \vdots & & \vdots \\ r_{n1} & r_{n2} & r_{n3} & \ldots & r_{nn} \end{bmatrix}$$

Multiply:

$$r_{11} = a_{11} \bullet b_{11} \oplus a_{12} \bullet b_{12} \oplus \ldots \oplus a_{1n} \bullet b_{1n}$$

$$r_{12} = a_{11} \bullet b_{21} \oplus a_{12} \bullet b_{22} \oplus \ldots \oplus a_{1n} \bullet b_{2n}$$

$$\vdots$$

$$r_{1n} = a_{11} \bullet b_{n1} \oplus a_{12} \bullet b_{n2} \oplus \ldots \oplus a_{1n} \bullet b_{nn}$$

$$r_{21} = a_{21} \bullet b_{11} \oplus a_{22} \bullet b_{12} \oplus \ldots \oplus a_{2n} \bullet b_{1n}$$

$$\vdots$$

$$r_{nn} = a_{n1} \bullet b_{n1} \oplus a_{n2} \bullet b_{n2} \oplus \ldots \oplus a_{nn} \bullet b_{nn}$$

$\oplus$ = XOR
$\bullet$ = AND
$+$ = OR

Compare:

$$r_{11} = a_{11} \bullet b_{11} + a_{12} \bullet b_{12} + \ldots + a_{1n} \bullet b_{1n}$$

$$r_{12} = a_{11} \bullet b_{21} + a_{12} \bullet b_{22} + \ldots + a_{1n} \bullet b_{2n}$$

$$\vdots$$

$$r_{1n} = a_{11} \bullet b_{n1} + a_{12} \bullet b_{n2} + \ldots + a_{1n} \bullet b_{nn}$$

$$r_{21} = a_{21} \bullet b_{11} + a_{22} \bullet b_{12} + \ldots + a_{2n} \bullet b_{1n}$$

$$\vdots$$

FIG. 2

INCLUSIVE OR BIT MATRIX TO COMPARE MULTIPLE CORRESPONDING SUBFIELDS

CROSS-REFERENCE TO RELATED APPLICATIONS

This application claims the benefit of U.S. Provisional Application Ser. No. 61/186,810, filed Jun. 12, 2009, which application is incorporated herein by reference and made a part hereof in its entirety.

FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. MDA904-02-3-0052, awarded by the Maryland Procurement Office.

FIELD OF THE INVENTION

The invention relates generally to computer instructions, and more specifically to using an inclusive "OR" bit matrix compare instruction in the comparison of multiple corresponding subfields of data items.

BACKGROUND

Most general purpose computer systems are built around a general-purpose processor, which is typically an integrated circuit operable to perform a wide variety of operations useful for executing a wide variety of software. The processor is able to perform a fixed set of instructions, which collectively are known as the instruction set for the processor. A typical instruction set includes a variety of types of instructions, including arithmetic, logic, and data movement instructions.

Arithmetic instructions include common math functions such as add and multiply. Logic instructions include logical operators such as AND, NOT, and invert, and are used to perform logical operations on data. Data movement instructions include instructions such as load, store, and move, which are used to handle data within the processor.

Data movement instructions can be used to load data into registers from memory, to move data from registers back to memory, and to perform other data management functions. Data loaded into the processor from memory is stored in registers, which are small pieces of memory typically capable of holding only a single word of data. Arithmetic and logical instructions operate on the data stored in the registers, such as adding the data in one register to the data in another register, and storing the result in one of the two registers or in a third register.

Oftentimes comparison of data will require comparison of multiple subfields of data. This typically entails execution of numerous instructions per field.

SUMMARY

In an example embodiment of the invention, subfields of a bit string are compared to a reference bit string by loading a bit matrix with one or more subfields of a first bit string to be searched, and loading a second bit string with a reference bit string. A bit matrix compare operation is executed on the reference pattern bit string and one or more subfields of the first bit string stored in the bit matrix to form a bit matrix compare result indicating whether the reference bit pattern matches one or more of the subfields.

BRIEF DESCRIPTION OF THE FIGURES

FIG. 1 shows a bit matrix compare instruction, consistent with example embodiments of the invention.

FIG. 2 shows a vectorized bit matrix compare instruction, consistent with some embodiments of the invention.

DETAILED DESCRIPTION

Figure 3:
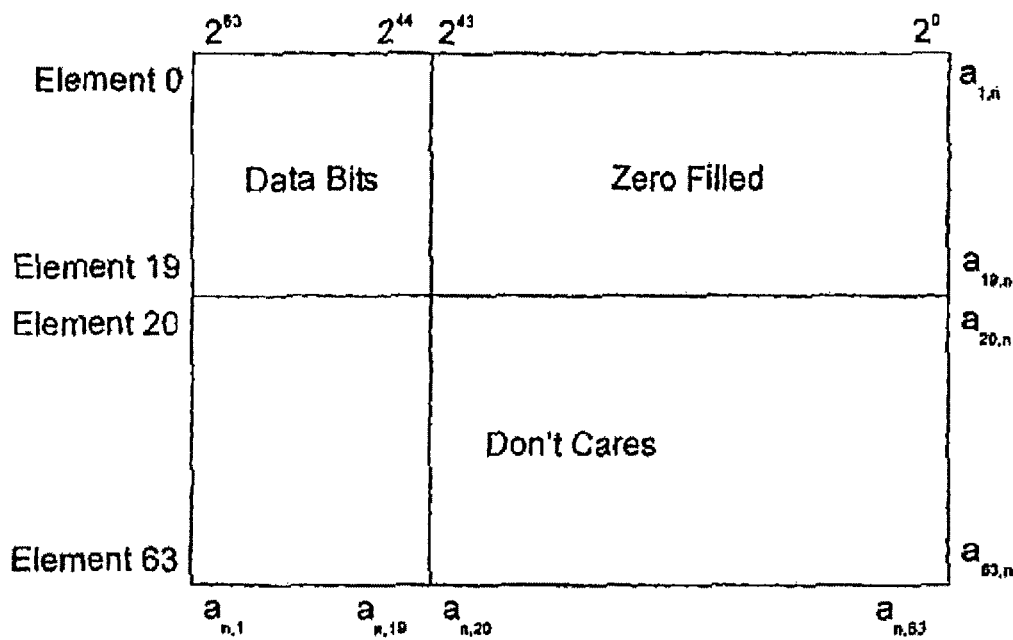
FIG. 3 shows loading a bit matrix register "a" with a data set smaller than the array size, consistent with some embodiments of the invention.

In the following detailed description of example embodiments of the invention, reference is made to specific example embodiments of the invention by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit other embodiments of the invention or the invention as a whole, and any reference to the invention, its elements, operation, and application do not limit the invention as a whole but serve only to define these example embodiments. The following detailed description does not, therefore, limit the scope of the invention, which is defined only by the appended claims.

Sophisticated computer systems often use more than one processor to perform a variety of tasks in parallel, use vector processors operable to perform a specified function on multiple data elements at the same time, or use a combination of these methods. Vector processors and parallel processing are commonly found in scientific computing applications, where complex operations on large sets of data benefit from the ability to perform more than one operation on one piece of data at the same time. Vector operations specifically can perform a single function on large sets of data with a single instruction rather than using a separate instruction for each data word or pair of words, making coding and execution more straightforward.

Similarly, address decoding and fetching each data word or pair of data words is typically less efficient than operating on an entire data set with a vector operation, giving vector processing a significant performance advantage when performing an operation on a large set of data.

The actual operations or instructions are performed in various functional units within the processor. A floating point add function, for example, is typically built in to the processor hardware of a floating point arithmetic logic unit, or floating point ALU functional unit of the processor. Similarly, vector operations are typically embodied in a vector unit hardware element in the processor which includes the ability to execute instructions on a group of data elements or pairs of elements. The vector unit typically also works with a vector address decoder and other support circuitry so that the data elements can be efficiently loaded into vector registers in the proper sequence and the results can be returned to the correct location in memory.

Operations that are not available in the hardware instruction set of a processor can be performed by using a combination of the instructions that are available to achieve the same result, typically with some cost in performance. For example, multiplying two numbers together is typically supported in hardware, and is relatively fast. If a multiply instruction were not a part of a processor's instruction set, available instructions such as shift and add can be used as a part of the software program executing on the processor to compute a multiplication, but will typically be significantly slower than performing the same function in hardware.

Some embodiments of the invention described herein therefore make use of a bit matrix compare operation. The bit matrix compare operation is a hardware instruction that uses the inclusive-OR function as the addition operation of a bit matrix multiplication, which can be used as an operation in a sequence of operations to compare each element of a matrix or array with the other elements of the matrix or array.

In one more detailed example shown in FIG. 1, a 1×64 bit data element in a 1×64 bit matrix A is bit matrix compared to 1'64 bit data elements in a second 64×64 bit matrix B, and the result is given by 64×64 bit result matrix R. In this example, the bits of matrix B are transposed before the AND and OR operations are performed on the matrix elements, and the bits of at least one of matrix A and matrix B are inverted before the bit matrix compare operation is performed.

The equations used to compare the rows of matrix A to the columns of matrix B are also shown in FIG. 1, which illustrates by example how to calculate several result matrix elements. As the compare result equations indicate, the first element of the result vector r1 indicates whether element a1 and b11 are the same, or whether a2 and b12 are the same, and so on. The result string therefore represents in each of its specific bit elements whether any of the elements of string A and corresponding elements of a specific column of matrix B are both one.

Because the result of the inclusive-OR bit matrix compare function indicates only whether any of the bits are the same, one of the bit strings is inverted to provide a result indicating whether any of the bits of the original bit strings are not the same. Inverting the bits comprises changing ones to zeros and zeros to ones, and is sometimes also called a one's complement. The AND function used to compare bits yields a true result, indicating that the inverted bit and the non-inverted bit match only if one but not the other of the original bits is a one. But, to ensure that the zero bit of a first matrix and the one bit of a second matrix are evaluated as not matching using the bit matrix compare function, the first matrix should be the matrix that is inverted. Because one values will be distributed in both the first and second matrices, but the result is sensitive to which string is inverted, the bit matrix compare function is repeated after inverting both strings in a further embodiment to ensure that the strings being evaluated are exact matches.

This bit matrix compare process is therefore then repeated, inverting the other of matrix A and matrix B before the bit matrix compare operation is performed, again checking whether any of the elements of string A and corresponding elements of a specific column of matrix B are both one. When both operations have concluded with a result of zero, it can be concluded that the bit string in matrix A and the column being evaluated in matrix B are the same.

This compare operation can be extended to operate on multiple vectors, as shown in FIG. 2. Here, vector bit matrix compare function is shown, in which a bit matrix A is vector bit matrix compared to a bit matrix B, and the result is shown in bit matrix r. Again, the bits of at least one of bit matrix A and B are inverted before the bit matrix compare operation is performed, such as by inverting the bits when reading them into the processor's logic or arithmetic unit. The equations used to calculate the elements of the result matrix are also shown in FIG. 2, and illustrate that the various elements of the result matrix indicate whether any of the elements of a given row of matrix a and any elements of a given column of matrix b are both one in value. This process is repeated, inverting the bits of the other of matrix A and B before performing the inclusive OR bit matrix compare, and if both results are zero it can be concluded that the bit strings are the same.

In some further embodiments, arrays or matrix arrays of a given capacity are used to store data sets of a smaller capacity. FIG. 3 shows an example in which a bit matrix register A with a 64-bit capacity is filled with a 20-bit matrix, and the rest of the elements are filled with either zeros or with values that do not matter in calculating the final result matrix. The vector bit matrix compare result register therefore also contains a matrix of the same 20-bit size, with the remaining bits not a part of the result.

Figure 4:
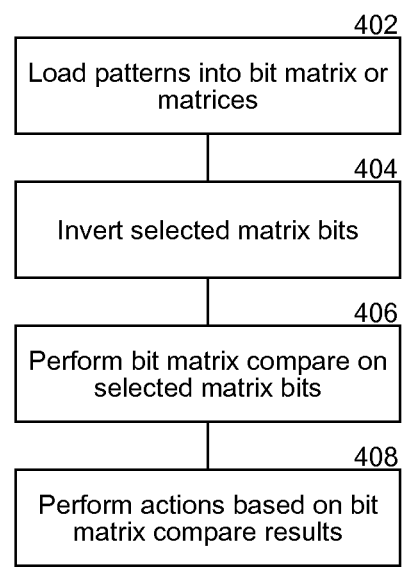
FIG. 4 is a flowchart of a method of comparing subfields of data using a bit matrix compare instruction, according to an example embodiment of the invention.

FIG. 4 is a flowchart that illustrates an example method according to embodiments for using the bit matrix compare instruction to provide results of a comparison of two data items at locations defined by one or more patterns "$P_i$". At block 402, the one or more patterns specifying locations of interest are loaded into a bit matrix, or into bit matrices to be compared to one another. The patterns may be used to segregate subfields for comparison purposes.

At block 404, one of a first data element (e.g., S1) and a second data element (e.g., S2) is inverted, and a bit matrix compare operation is performed on the data elements as shown at 406. In some embodiments, the data elements may be the natural word size of the hardware, for example, 64 bits. The result is a bit pattern in which a bit is set in the result as described above with respect to FIG. 1. This process is repeated, inverting the other of the data elements S1 and S2 to determine whether the elements are the same, or the locations of bits by which they differ.

At block 408, the results determined at block 406 may be displayed to a user, or used in further operations.

The above may be expressed as an equation:

$$R = BMC\ (S1\ .xor.\ S2)$$

where one or more arbitrary patterns of bits, P are loaded in a bit matrix and where S1 and S2 are two data words that can be compared to determine if there are differing bits at any of the locations specified by the bits in a pattern P, and where BMC is the inclusive OR bit matrix multiply operation and one bit string is inverted before the bit matrix compare operation is performed. If $P_0$ is loaded into the first word of the bit matrix, then the leftmost bit of R will be 1 if any of the corresponding bits is different, and 0 if all the corresponding bits are the same.

In some embodiments, up to 64 independent patterns can tested with a single operation using a 64-bit matrix, with one pattern in each entry of the bit matrix, and the results in the corresponding 64 bits of R.

The number of subfields of the data words that differ can be computed as:

$$D = \mathrm{popcnt}(R)$$

where each subfield corresponds to a pattern in the bit matrix used to compute R and where popcnt (i.e., population count) is a function or operation that counts the number of bits in its argument that are set to 1.

The bit matrix compare function as applied here is understood to include performing the bit matrix compare function after inverting the bits of one of the matrices being compared, and repeating the process after inverting the other of the matrices being compared to confirm that the bit strings are identical.

Figure 5:
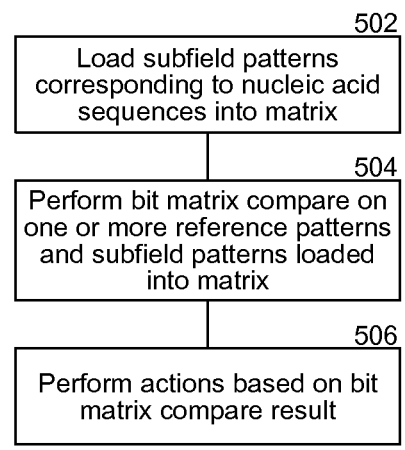
FIG. 5 is a flowchart of a method of comparing subfields of encodings of nucleic acid data using a bit matrix compare instruction, according to an example embodiment of the invention.

FIG. 5 is a flowchart that illustrates an example method according to embodiments for using the bit matrix compare instruction to provide results of a comparison of two encodings of nucleic acids of DNA molecules. In some embodiments, the encoding comprises transforming the A, C, T and G nucleic acids to 2-bit values 00, 01, 10 and 11 respectively. Those of skill in the art will recognize that other encodings are possible and within the scope of the inventive subject matter. Thus assuming a 64-bit word, 32 2-bit fields may be compared. At block 502, the one or more patterns defining subfield locations are loaded into the bit matrix. In some embodiments, a bit matrix with a 64-bit dimension is loaded with 32 patterns, one pattern corresponding to each of the 32 2-bit fields. An example loop to provide such an initialization is:

```
do i=0,31
    bmm(i) = shiftr(z"c000000000000000",2*i)
end do
bmm(32:63) = 0
``` where bmm(i) is the ith element of the bit matrix and where shiftr is the arithmetic shift right operation. Thus in the example loop above, the first entry is the hexadecimal value "c000000000000000", and each successive entry is shifted two bits to the right, reflecting the number of bits used for each symbol in the nucleic acid sequence. The final 32 entries are set to 0.

The matrix is therefore filled with sequentially shifted copies of the nucleic acid sequence that can be evaluated against one or more reference sequences, such as a bit string or elements of another matrix to find matches. At block 504, a bit matrix compare operation is performed using the one or more reference sequence patterns and the nucleic acid sequences loaded into the matrix at 502. In some embodiments, the comparison is an inclusive OR bit matrix multiply operation (BMC) that is repeated twice, and alternating bit strings are inverted before the bit matrix compare functions are performed. The result of the bit matrix compare functions is a bit pattern in which a bit is set in the result R as described above with respect to FIG. 1.

At block 506, the results determined at block 504 may be displayed to a user, or used in further operations. For example, a popcnt function or operation may be used to determine the number of corresponding locations where the nucleic acids differ. Multiple sequences can be compared to provide fast gap-free comparisons of genomic sequences.

Figure 6:
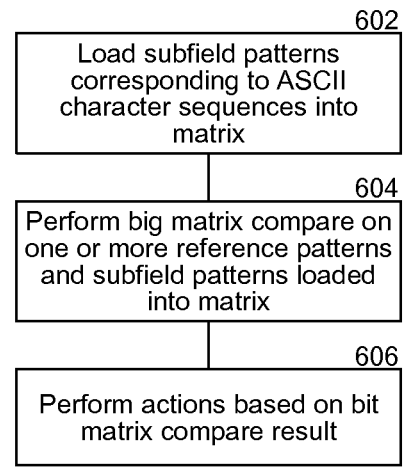
FIG. 6 is a flowchart of a method of comparing subfields of character strings using a bit matrix compare instruction, according to an example embodiment of the invention.

FIG. 6 is a flowchart that illustrates an example method according to embodiments for using the bit matrix compare instruction to provide results of a comparison of two character strings. The character strings may be encoded as 8 bit ASCII characters. Thus assuming a 64-bit word size, up to 8 characters may be compared at a time. Those of skill in the art will recognize that other character encodings are possible and within the scope of the inventive subject matter.

At block 602, the one or more patterns defining subfield locations are loaded into the bit matrix. In some embodiments, a bit matrix is loaded with 8 patterns, one pattern corresponding to each of the 8 8-bit fields used to hold character data. An example loop to provide such an initialization is:

```
do i=0,7
    bmm(i) = shiftr(z"ff00000000000000",8*i)
end do
bmm(8:63) = 0
``` where bmm(i) is the ith element of the bit matrix and where shiftr is the arithmetic shift right operation. Thus in the example loop above, the first entry is the hexadecimal value "ff00000000000000", and each successive entry is shifted eight bits to the right, so that each entry reflects a new ASCII character. The final 56 entries are set to 0.

At block 604, a bit matrix compare operation is performed using the bit matrix loaded with data at 604, compared with another matrix, or bit string. In some embodiments, the comparison is an inclusive OR bit matrix compare operation (BMC), and one of the bit strings is inverted. The result is a bit pattern in which a bit is set in the result R as described above with respect to FIG. 1. The results R will contain bits specifying which characters are different in strings S1 and S2. If R is equal to 0, then the strings match. If R is not equal to 0, then the position of bits set to 1 in R determine the location of non-matching characters.

The above may be represented in equation form as:

$$R = \mathrm{BMC}(S1 \text{ .xor. } S2)$$

At block 606, the results determined at block 604 may be displayed to a user, or used in further operations. For example, a popcnt function or operation may be used to determine the number of corresponding locations in S1 and S2 where the characters differ. The value 8-popcnt(R) is the number of matching characters. The value leadz(R), where leadz returns the number of leading zeros of its argument, is the location of the first non-matching character. These and other operations and functions may be used to implement various string comparison routines.

In some embodiments using ASCII characters, the string comparison detailed above can be made case insensitive simply by replacing the pattern "ff00000000000000" with "5f00000000000000" such that the bit that differentiates case in the ASCII character set is ignored.

The bit matrix compare functions described herein can be implemented into the hardware functional units of a processor, such as by use of hardware logic gate networks or microcode designed to implement logic such as the equations shown in FIGS. 1 and 2. Because the bit matrix compare function is implemented in hardware, the function can be executed using only a single processor instruction rather than the dozens or hundreds of instructions that would normally be needed to implement the same function on a 64-bit matrix in software. The instruction can then be used such as by using it in combination with other instructions such as bit inversion to determine the number of bits by which a particular set of data differ from another, the location and number of elements that repeat, and similar such functions.

The vector and scalar bit matrix compare instructions implemented in hardware in processors therefore enable users of such processors to perform these functions significantly faster than was previously possible in software, including to identify repeated values in an array or matrix such as in a vector index array. When evaluating index values for a loop, such as in the example above, the bit matrix compare function compares each element against the other elements of the index array, indicating which elements are the same as which other elements in the index vector.

Although specific embodiments have been illustrated and described herein, it will be appreciated by those of ordinary skill in the art that any arrangement that achieve the same purpose, structure, or function may be substituted for the specific embodiments shown. This application is intended to cover any adaptations or variations of the example embodiments of the invention described herein.

What is claimed is:

1. A method performed by a computer of determining whether elements of a bit matrix match a reference bit string, the computer having an instruction set with a bit matrix compare instruction that performs a bit matrix compare operation, the method comprising:
    loading elements of the bit matrix;
    loading the reference bit string;
    performing a comparison between the reference bit string and one or more elements of the bit matrix to determine whether the reference bit string matches one or more of the elements by:
    executing the bit matrix compare instruction of the computer on elements of the bit matrix and an inverted reference bit string that are loaded into registers of the computer; and
    executing the bit matrix compare instruction of the computer on inverted elements of the bit matrix and the reference bit string that are loaded into registers of the computer; and
    indicating that an element matches the reference bit string when results for that element from both executions of the bit matrix compare instruction are zero.

2. The method of claim 1, wherein the bit matrix compare instruction performs a logical OR of a logical AND of corresponding bits of the reference string and each element of the bit matrix.

3. A computerized system that includes a computer for determining whether elements of a bit matrix match a reference bit string, the computer having an instruction set with a bit matrix compare instruction that performs a bit matrix compare operation, operable to:
    load a bit matrix with one or more elements;
    load a reference bit string; and
    performing a comparison between the reference bit string and one or more elements of the bit matrix to determine whether the reference bit string matches one or more of the elements, the comparison being performed by:
    executing the bit matrix compare instruction on the bit matrix and an inverted reference bit string that are stored in registers of the computer; and
    executing the bit matrix compare instruction on an inverted bit matrix and the reference bit string; and
    indicating whether the reference bit string matches one or more elements based on results for an element of both executions of the bit matrix compare instruction being a zero.

4. The computerized system of claim 3, wherein the bit matrix compare instruction is a vector instruction.

5. A method performed by a computer for determining whether elements of a bit matrix match a reference bit string, the computer having an instruction set with a bit matrix compare instruction that performs a bit matrix compare operation, comprising:
    performing a comparison between the one or more elements and a reference bit string to determine whether the reference bit string matches the one or more elements by:
    executing a bit matrix compare instruction of the computer on the one or more elements and an inverted reference bit string that are loaded into registers of the computer and
    executing the bit matrix compare instruction on inverted one or more elements and the reference bit string that are loaded into registers of the computer; and
    indicating whether the reference bit string matches one or more elements based on results for an element of both executions of the bit matrix compare instruction being a zero.

6. A method performed by a computer of determining whether a first string is equal to a second string, the computer having an instruction set with a bit matrix compare instruction that performs a bit matrix compare operation, the method comprising:
    executing a bit matrix compare instruction of a computer with the first string and a ones' complement of the second string as operands that are loaded into registers of the computer;
    executing the bit matrix compare instruction with a ones' complement of the first string and the second string as operands that are loaded into registers of the computer; and
    when the result of both executions of the bit matrix compare instruction is a zero, indicating that the first string and the second string are equal.

* * * * *

UNITED STATES PATENT AND TRADEMARK OFFICE
CERTIFICATE OF CORRECTION

PATENT NO. : 8,954,484 B2  
APPLICATION NO. : 12/814101  
DATED : February 10, 2015  
INVENTOR(S) : William F. Long et al.

Page 1 of 1

It is certified that error appears in the above-identified patent and that said Letters Patent is hereby corrected as shown below:

On the Title Page, Item (56)

On page 2, in column 1, under "Other Publications", line 1, delete "Matricies,"" and insert -- Matrices," --, therefor.

On page 2, in column 1, under "Other Publications", line 4, delete "sloutions,"" and insert -- solutions," --, therefor.

In the Specification

In column 3, line 30, delete "1"64" and insert -- 1×64 --, therefor.

Signed and Sealed this  
Thirtieth Day of June, 2015

Michelle K. Lee  
*Director of the United States Patent and Trademark Office*